United States Patent [19]

Grodzinsky et al.

[11] 4,161,013
[45] Jul. 10, 1979

[54] ELECTROMECHANOCHEMICAL DEVICE

[75] Inventors: Alan J. Grodzinsky, Watertown, Mass.; Norman A. Shoenfeld, Brooklyn, N.Y.

[73] Assignee: Massachusetts Institute of Technology, Cambridge, Mass.

[21] Appl. No.: 799,486

[22] Filed: May 23, 1977

[51] Int. Cl.$^2$ .................. H01G 9/00; B01D 13/00
[52] U.S. Cl. ............................. 361/433; 204/299 R; 210/19; 210/243; 210/356; 210/500 M
[58] Field of Search ........... 361/433; 210/243, 500 M, 210/356, 19; 204/299 R, 180 R, 180 P, 186; 60/721

[56] References Cited

U.S. PATENT DOCUMENTS

| | | | |
|---|---|---|---|
| 3,123,482 | 3/1964 | Lieberman | 426/516 X |
| 3,152,976 | 10/1964 | Kuntz | 8/94.18 X |
| 3,321,908 | 5/1967 | Katchalsky et al. | 60/721 |
| 3,491,022 | 1/1970 | Huff | 210/19 |
| 3,989,613 | 11/1976 | Gritzner | 204/180 R |
| 4,057,483 | 11/1977 | Giuffrida | 204/180 P |

OTHER PUBLICATIONS

A. J. Grodzinsky et al., "Electrochemical Transduction with Charged Polyelectrolyte Membranes", *IEEE Transactions on Biomedical Engineering*, vol. BME-23, No. 6, Nov. 1976, pp. 421-433.
Yannas et al., "Electromechanical Energy Conversion with Collagen Fibers in an Aqueous Medium", *Mechanochem. Cell Motility*, 1973, vol. 2, pp. 113-118, 121-125.

Primary Examiner—James W. Davie
Attorney, Agent, or Firm—Arthur A. Smith, Jr.; Robert Shaw

[57] ABSTRACT

An electro-mechanochemical device wherein a polyelectrolyte film formed of fixed-charge, molecular groups immersed in an aqueous electrolyte comprising mobile ions is subjected to an electric field which acts to control the internal profile of mobile ions inside the polyelectrolyte film in such a way that the arrangement of the molecules that form the matrix of said film is affected.

37 Claims, 11 Drawing Figures

ELECTROMECHANOCHEMICAL DEVICE

The Government has rights in this invention pursuant to Contract No. ENG74-09744 and Institutional Patent Agreement No. 0010, awarded by the National Science Foundation.

The present invention relates to devices wherein the conformational arrangement of molecules comprising a polyelectrolyte film is controlled by controlling an electric field environment across the film.

By way of background, attention is called to a journal article entitled "Electromechanical Transduction with Charged Polyetrolyte Membranes" (Grodzinsky et al), IEEE Transactions of Biomedical Engineering, Vol. BME-23, No. 6, November 1976, pp. 421-433, a journal article entitled "Electromechanical Energy Conversion with Collagen Fibers in an Aqueous Medium" (Yannas et al), J. Mechanochem Cell Motility, 1973, Vol. 2, pp. 113-125, and a journal article entitled "Tensile Forces Induced in Collagen by Means of Electro-Mechanochemical Transductive Coupling" (Grodzinsky and Shoenfeld), as well as Polymer, vol. 18, May 1977 pp. 435-443, U.S. Pat. Nos. 1,536,569 (Cruse), 2,400,951 (Reid) 3,152,966 (Kuntz) 3,090,735 (Mandelkern et al) and 3,321,908 (Katchalsky).

As mentioned in the Grodzinsky and Shoenfeld journal article, previous investigators (e.g., the patents cited above) have developed techniques whereby the passive diffusion of certain specific chemical reagents into certain polyectrolyte materials results in deformation of those materials, which deformation can be used to do mechanical work.

The electromechanochemical techniques invented by the present inventors employ an applied electric field which enables active, localized control of induced tensile forces in polyelectrolytes. First, the applied electric field can actively control the spatial and temporal dependence of not only specific chemical reagent species but more generally any neutral salt mobile ionic species within the polyelectrolyte matrix. This active control has been demonstrated to occur by several, distinct mechanisms and is found to be faster than that accorded by the simple passive diffusion of chemical species into the matrix.

The electrically controlled changes in the spatial profile of chemical species is converted by the polyelectrolyte matrix into tensile forces by several distinct mechanisms, depending on the nature of the chemical species involved. Thus, the performance of electromechanochemical transductive coupling devices depends on the electrical, mechanical and chemical properties of the chosen polyelectrolyte, the electrical, chemical and fluid mechanical properties of the aqueous electrolyte solution which bathes the polyelectrolyte, and the magnitude, polarity and time dependence of the applied electric field. Any and all of the above parameters can in general be tailored so as to produce devices with desired mechanical outputs, as described in the Grodzinsky and Shoenfeld report.

The experiments detailed in the Grodzinsky and Shoenfeld report show that electric field-induced changes in the microscopic structure of a polyelectrolyte such as collagen can be harnessed to yield, on the one hand, a macroscopic force and the concomitant performance of mechanical work. On the other hand, such electrically controlled changes in polyelectrolyte matrix architecture at the ultrastructural level will also manifest themselves in altered hydrodynamic and ionic permeabilities. This leads to another class of electromechanochemical transductive coupling devices dealing with the actively controlled hydrodynamic and ionic permeation of polyelectrolyte materials and the active control of filtration of electrolyte and non-electrolyte molecules and ions from electrolyte solutions.

Accordingly, it is an object of the present invention to provide a novel force transducer.

Another object is to provide the active, real time control of such transducer by the use of an electric field which affords overall control of the device.

A further object is to provide a filter wherein the apertures of a film that effects filtration are changed in size by changing electric field intensity in the region occupied by the film.

A still further object is to further affect the aforesaid mechanism of filtration wherein the applied electric field exerts an influence on the molecules as ions to be filtered when these molecules and ions are charged.

These and still further objects are addressed hereinafter.

The foregoing objects are achieved in a transductive device that includes a polyelectrolyte film made up of fixed-charge, molecular groups immersed in an aqueous electrolyte comprising mobile ions, the polyelectrolyte film being disposed in an electric field whose intensity is controlled to actively and independently control the internal profile of certain mobile ions inside the polyelectrolyte film and, hence, to actively control the conformational arrangement of the molecules composing the film.

The invention is hereinafter described with reference to the accompanying drawing in which.

$$e, E_o=0; \ b,d,E_o>0; \ a,c,E_o<0;$$

Figure 1:
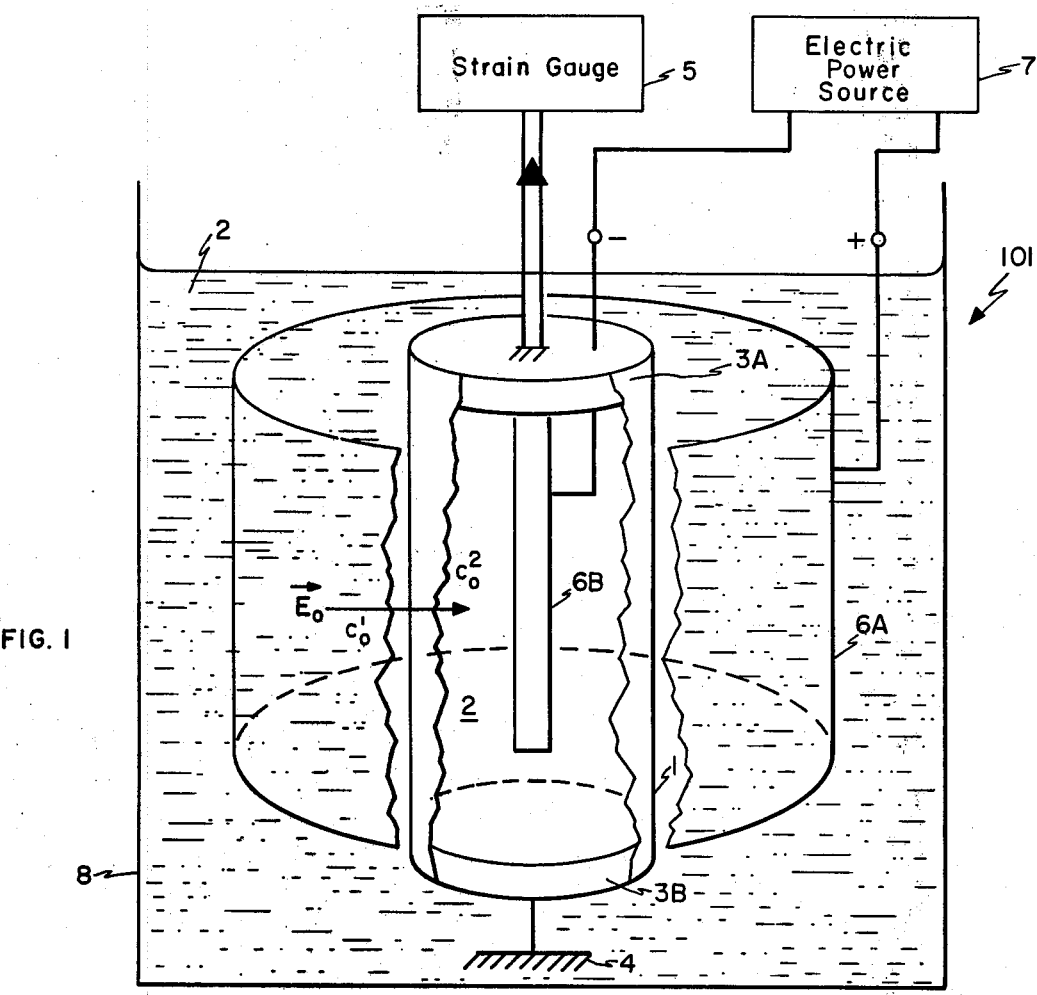
FIG. 1 is a schematic representation, partly cutaway, of an electro-mechanochemical transducer for isometric electro-mechanochemical transduction and includes a membrane or film.
Figure 4:
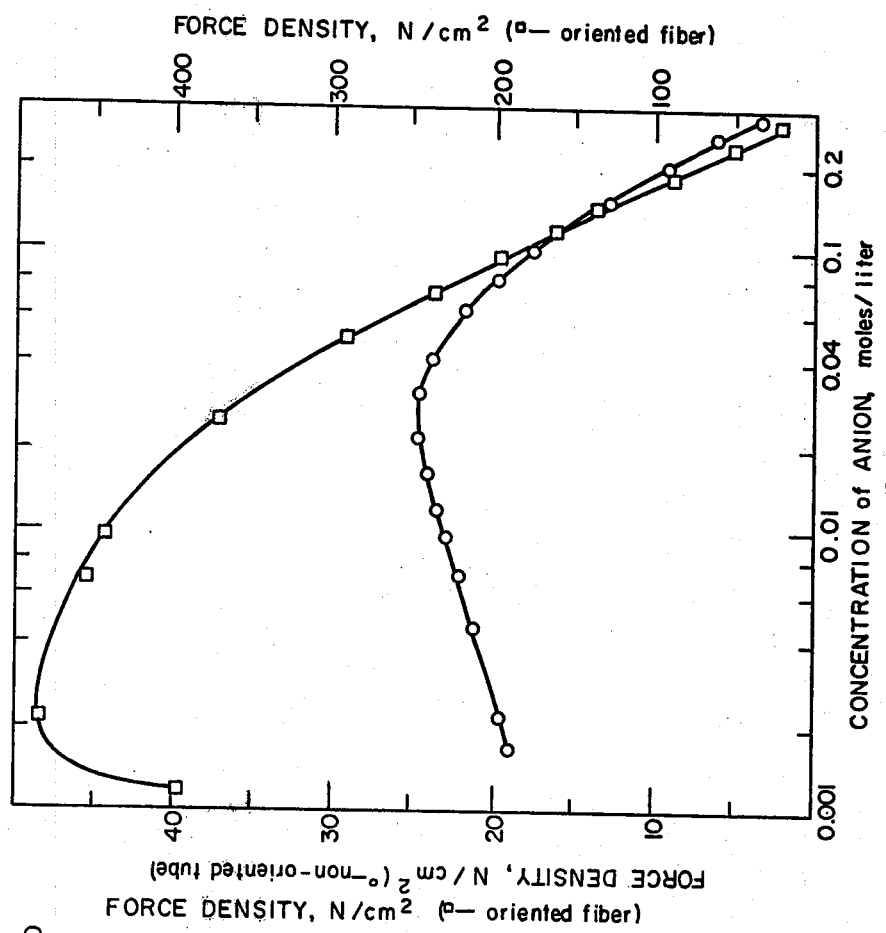
Figure 3:
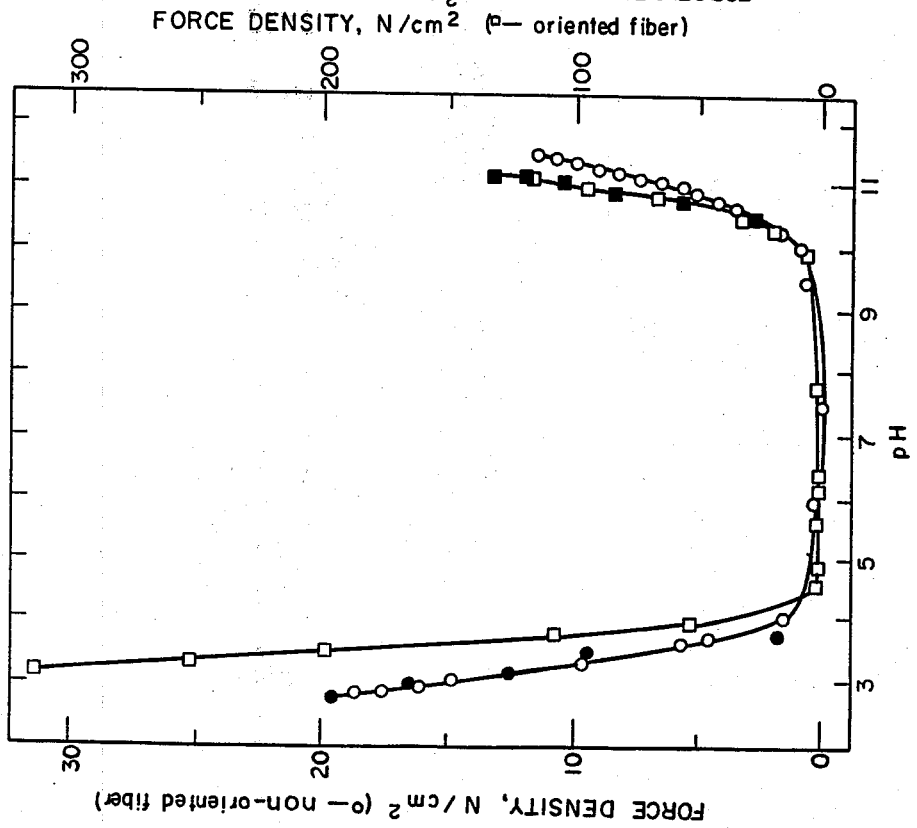
Figure 5A:
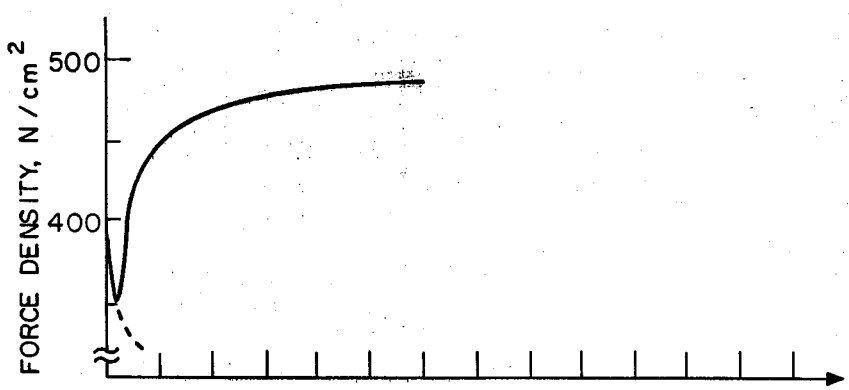
Figure 5B:
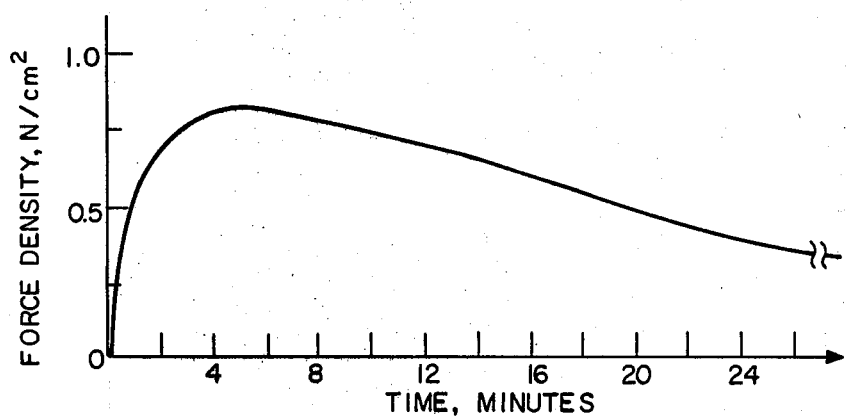
Figure 6:
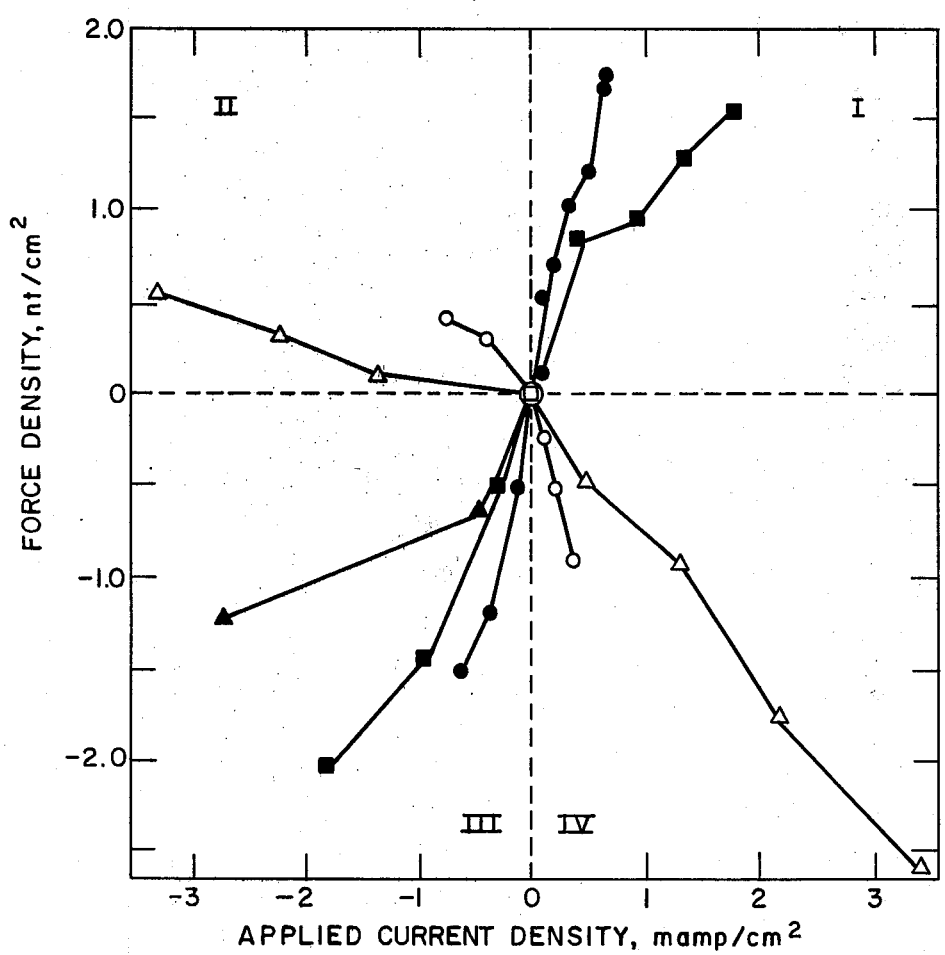
Figure 7A:
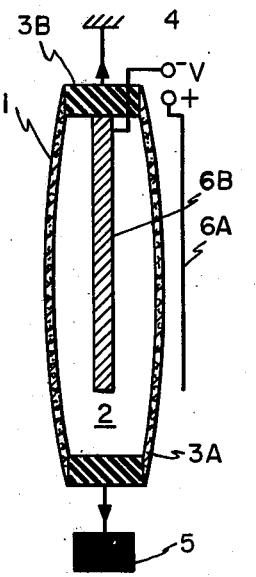
Figure 7B:
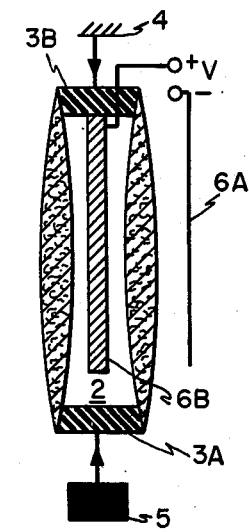
Figure 8A:
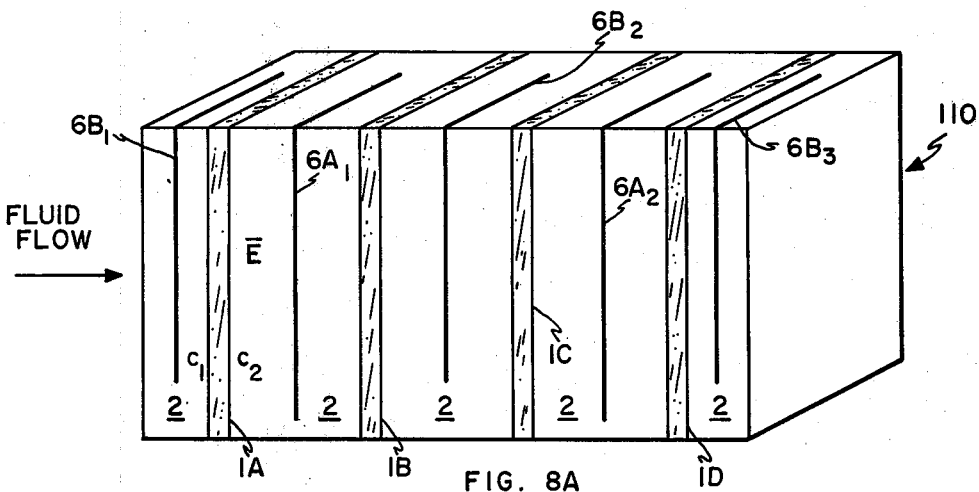
Figure 8B:
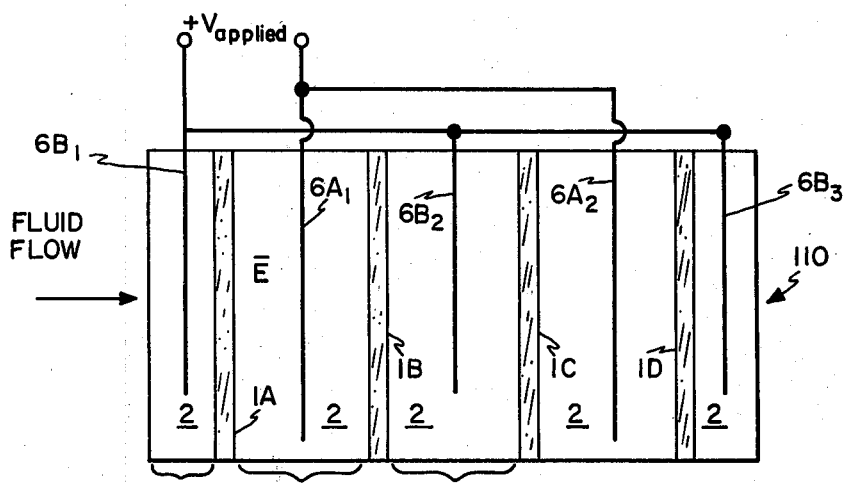

FIG. 3 is a graph showing change in equilibrium isometric force density, referred to dry specimen cross-sectional area, about an initial stretching force over an extended pH range. ●, 0, data for a single tube specimen of said membrane or film with bath pH first decreased, ●, and then increased, 0; ■, □, with an oriented collagen fiber shown for comparison the pH first being increased, ■, then decreased, □, the ionic strength being 0.06 M (NaCl) at beginning of both experiments; less than 0.066 M at the end for each;

FIG. 4 is a graph showing change in isometric force density due to successive increments in NaCl at constant pH. 0, tube pH=2.8; □fiber, pH=2.93;

FIG. 5A is a graph showing change in force density after a single step increase in NaCl concentration for an oriented fiber initially in a bath at pH 2.93 with no neutral salt, the final chloride ion concentration=0.002 M;

FIG. 5B is a graph of electro-mechanochemically induced change in force density in response to a single step jump in J for a low applied $J=0.12$ ma/cm$^2$; $c_o{}^1=0.002$ M/$c_o{}^2=0.012$ M NaCl; pH=2.8;

FIG. 6 shows representative electro-mechanochemical coupling data obtained with a collagen tube in the acidic region supporting gradients in NaCl concentration having the values •, $c_o{}^1=0.002$ M/$c_o{}^2=0.012$ M; 0, $c_o{}^1=0.012$ M/$C_o{}^2=0.002$ M; ■, $c_o{}^1=0.012$ M/$c_o{}^2=0.06$ M; ▲, $c_o{}^1=0.06$ M/$c_o{}^2=0.2$ M; △, $c_o{}^1=0.2$ M/$c_o{}^2=0.06$ M, applied current density J being related to $E_o$ by equation 13 herein and wherein $c_o{}^1$ and $c_o{}^2$ are hereinafter defined (force density is referred to membrane cross-sectional area and current density to cylindrical surface area);

FIGS. 7A and 7B are schematic representations, in cross section similar to FIG. 1, respectively showing a transduction device with only a bias tension force being exerted by the device and a tension force being exerted by virtue of an applied electric field; and FIGS. 8A and 8B are respectively an isometric view and a top view showing, schematically, an electro-mechanochemical filter with electric field control of polyelectrolyte membrane permeability for filtration of molecules.

In the discussion of the invention that now follows, great reliance is placed upon the Grodzinsky and Shoenfeld report which may be used for amplification of some aspects of the present specification and for background work of other investigators. In the explanation below the invention is described mostly with reference to force transductive coupling devices, but, as will be seen, the concepts herein disclosed have uses in electro-mechanochemical filtration devices, as well.

Turning now to FIG. 1, an electro-mechanochemical transductive coupler is shown at 101 comprising a tubular polyelectrolyte film 1 comprising fixed-charge molecular groups immersed in an aqueous electrolyte bath 2 comprising mobile ions and consisting of an inner bath $c_o{}^2$ and an outer bath $c_o{}^1$. In the Grodzinsky and Shoenfeld report the polyelectrolyte film is a protein film and, specifically, collagen. The tubular membrane 1 is mechanically supported in tension at its upper and lower ends respectively by electrically insulating discs 3A and 3B which serve to maintain the tubular configuration and to transmit tensile forces between a fixed support 4 and a strain gauge 5.

Means is provided for applying an electric field $\vec{E}_o$ across the film 1 to control the internal profile of mobile ions inside the polyelectrolyte film and, hence, as later discussed in detail herein, the conformational configuration of the fixed-charge molecular groups forming the film 1. The electric field $\vec{E}_o$ in FIG. 1 is created between a cylindrical outer electrode 6A and a cylindrical, coaxial inner electrode 6B, the electrodes 6A and 6B being connected across a variable-voltage power source 7. It is later shown that the field $\vec{E}_o$ in the system 101 acts to create a tensile force between the points 4 and 5 in the system and that the magnitude of that force is changed by varying the voltage applied between the electrodes 6A and 6B. It is further shown that the tensile force is a function of the conformational configuration of the molecular matrix of the film and that changes in the force are effected by rendering modification of said configuration.

A few specifics as to the elements that form the system 101 are contained in this paragraph. The film 1 can be a protein (e.g., collagen) but other natural polyelectrolyte films (e.g., those made from mucopolysaccharides nucleic acids, or intact charged biological membranes) can be employed. In addition, synthetic polyelectrolytes made from charged organic and inorganic polymers can also be used, provided they posses the combination of mechanical, electrical and chemical properties discussed in the Grodzinsky and Shoenfeld report. The mobile ions in the bath 2 discussed in the Grodzinsky and Shoenfeld report are monovalent, neutral salt species such as NaCl (i.e., Na$^+$ and Cl$^-$ in solution). But in general, divalent, trivalent or other multivalent neutral salt species such as CaCl$_2$ (i.e., Ca$^{++}$ and 2Cl$^-$ in solution), may be used, whose effects can have certain advantages over monovalent species. In addition, electric field control of specific mobile ions species (as opposed to neutral salts), e.g., H$^+$ ions, which chemically react with the molecules of the polyelectrolyte and hence either change the net charge and/or the structure of the individual polyelectrolyte molecules, form the basis of another class of electro-mechanochemical transduction devices. For example, H$^+$ or OH$^-$ ions can react with molecules of collagen to change their charge, which is shown in the Grodzinsky and Shoenfeld report to produce tensile forces in collagen films. Electric field control of the spatial profile of denaturant salts, such as LiBr, can lead to other very specific conformational changes (i.e., denaturation) that can be harnessed to actively produce mechanical work. These latter conformational changes are different from those caused by neutral salt ions in that the resulting changes in polyelectrolyte structure at the molecular and ultrastructural levels are quite different; the common focal point of all these various electromechanical transduction mechanisms is that they are all actively controlled by an applied electric field. There now follows a detailed analysis of the process by which the film 1 is caused to exert tension between the fixed points 4 and 5.

In the systems herein described electric fields are applied across a charged collagen membrane which supports a gradient in neutral salt mobile ion concentration. Experiments by the present inventors over a wide range of concentrations have shown that isometric tensile force densities larger than that of striated muscle can be induced by the applied field. The experimental results together with the trends predicted by a theoretical model suggest that the forces result from field-induced changes in intra-membrane salt concentration which in turn modify the internal double layer repulsive forces between charged fibrils. Characteristic times for this electromechanochemical transduction process are examined in terms of the various rate limiting processes of importance.

The experiments described below deal specifically with one class of electro-mechanochemical transduction mechanisms wherein the mobile ions are monovalent neutral salt ions which interact in a nonspecific electrostatic manner with polyelectrolyte molecules so as to induce tensile forces in the matrix. Following this detailed discussion is a summary of other electro-mechanochemical transduction mechanisms in which electric field control of other types of ions which interact specifically with polyelectrolyte molecules is described.

The experiments with collagen membranes by the present inventors demonstrate the feasibility of a transduction process whereby mechanical work is performed at the expense of chemical energy under the control of an applied electric field. While implantible device design and fabrication is an ultimate goal, the experiments have immediate relevance concerning transduction processes in the physiochemical characterization of native and synthetic biopolymers at the macromolecular level. Several mechanochemical energy conversion systems have been studied previously incuding those concerning chemical and thermal melting of collagen fibers and charge-mediated dimensional changes in (random-coil) polycarboxylic acid gels and ribbons. Experimental results by others (see the Yannas et al journal article) with oriented, lightly crosslinked collagen fibers in aqueous media have focused on changes in isometric force mediated by the lateral repulsion of electrical double layers associated with the charged fibrils.

The polyelectrolyte film may also be composed of glycosaminoglycans.

A new electro-mechanochemical transduction process involving electric fields applied across collagen membranes which support concentration gradients is the subject matter of the present disclosure. Experiments performed in an isometric configuration over a wide range of pH and ionic strength have shown that the applied field $E_o$ produces changes in tensile force. For these experiments, it is believed that $E_o$ induces changes in the intramembrane electrolyte concentration which then produce the measured changes in force, in a manner similar to that previously observed by the inventors with collagen fibers. The experimental results agree with the trends of a theoretical derivation based on such a hypothesis. The function of the field $E_o$ is essentially that of a switch to enable fast, localized control of electrolyte concentration and induced tensile forces. As $E_o$ can lead to several other mechanisms which might induce tensile forces such as a purely electromechanical coupling of an electrokinetic nature, experiments have been devised to distinguish between the phenomena which are believed to be at work in the present system. A comparison of the various rate processes and induced force magnitudes associated with these differing processes is given, hereinafter, suggesting the advantages and disadvantages of each as a potential transduction mechanism. Finally, it has also been found that the degree of fibril orientation in the specimen is an important parameter in the determination of the total available force density.

It has been found by others (see the Yannas et al journal article) that isometric force densities larger than that of striated muscle can be induced in oriented collagen fibers in a homogeneous electrolyte bath by either varying pH and hence collagen charge or by varying neutral salt concentration at constant, non-isoelectric pH. Both procedures vary the magnitude of lateral repulsion forces, i.e., forces perpendicular to the fiber axis, between the double layers of the axially oriented, charged fibrils. These lateral forces are converted by the crosslinked fibril matrix to changes in axial force density as large as 30–40 kgf/cm². In order to investigate electric field-control of such mechanochemical processes, the experimental transducer configuration shown schematically in FIG. 1 has been used in the work leading to the present invention. The tubular collagen membrane 1 of thickness $\delta$ separates the inner and outer baths $c_o^2$ and $c_o^1$, respectively, of equal, nonisoelectric pH but of two different neutral salt concentrations, e.g., $c_o^2 > c_o^1$. Thus the membrane 1 contains fixed, dissociated charge species as well as mobile ions. An electric field $\vec{E}_o$ can be applied perpendicular to the tube axis by means of the concentric cylindrical platinum electrodes 6A and 6B, one inside the collagen tube and the other surrounding it. Inner and outer electrolyte are continually renewed (not shown in FIG. 1).

With $\vec{E}_o = 0$, the steady state mobile ion concentration profile is defined by the physical constraints of the system and by the limiting boundary concentrations $c_o^1$ and $c_o^2$. Because the concentration varies smoothly from inner to outer edge of the membrane, the lateral electrical repulsion forces also vary in a similar fashion. Therefore the axial force per unit radial thickness will also vary smoothly. The total equilibrium ($\vec{E}_o = 0$) axial force is then the sum of the forces per unit thickness from inner to outer edge. If the application of $\vec{E}_o \neq 0$ leads to an altered concentration profile, the force profile and hence total force will change concomitantly. Such device operation applies for the case of an induced change in neutral salt concentration only, with membrane charge unaltered in the process. It will be shown that other mechanisms can also be used for electromechanochemical device operation.

The mobile ion concentration profiles inside the membrane are determined by a balance between the competing processes of ion migration due to $\vec{E}_o$, ion diffusion due to the imposed concentration gradient, and convection of mobile species in the advent of fluid flow through the membrane. Solution of such a problem has been widely investigated by others with respect to fixed-charge membrane models and the theory of transmembrane potentials. The additional possibility that an applied electric field can cause an electrokinetic movement of the membrane if it is non-rigid and deformable must also be included, as well as the possibility of a field-induced convective flow of fluid in and across the membrane (e.g., electro-osmosis). the role of such fluid flow in the determination of intramembrane concentration profile has been investigated by others with respect to a class of rigid membrane phenomena involving the oscillatory behavior of pressure and potential drops and fluid and mobile carrier flow; tensile forces were not of interest.

In order to delineate the way in which $\vec{E}_o$ can alter the concentration profile in a moving, deformable membrane, the problem is now formulated for the simple case of a uniformly charged membrane supporting a gradient in the concentration of a single mono-monovalent electrolyte such as NaCl. The outer and inner concentrations are the bulk concentrations defined as $c_o^1 \equiv c_{+o}^1 = c_{-o}^1$ and $c_o^2 \equiv c_{+o}^2 = c_{-o}^2$ respectively, as shown in FIG. 1. Though not necessary in this case, it is assumed for simplicity that diffusion coefficients inside the membrane $\overline{D}_+$ and $\overline{D}_-$ as well as ionic mobilities $\overline{u}_+$ and $\overline{u}_-$ are constant. For an incremental volume in the frame of the movable membrane, the continuity relations for mobile positive and negative species in the membrane, $\bar{c}_+$ and $\bar{c}_-$, are ($z_+ = |z_-| = 1$):

$$\frac{D\bar{c}_+}{Dt} = -\frac{1}{F} \nabla \cdot \vec{J}_+' \qquad (1)$$

$$\frac{D\bar{c}_-}{Dt} = +\frac{1}{F} \nabla \cdot \vec{J}_-' \qquad (2)$$

where F is the Faraday constant $J_+'$ and $J_-'$ are the respective ion current densities in the membrane frame, the convection derivative $D/Dt = \zeta/\zeta t + \vec{v}_m \cdot \nabla$, $\vec{v}_m$ being the membrane velocity; the right-hand terms in equations (1) and (2) involve carrier fluxes in the membrane frame. In general, additional terms can be added to equations (1) and (2) to account for chemical reactions in the membrane which would lead to production of depletion of the mobile species. Here, it is assumed for simplicity that the monovalent electrolyte of interest does not react with or bind to any groups in the collagen.

The electric current densities are written, accounting for diffusion, migration and fluid convection with respect to the movable membrane:

$$\vec{J}_+' = -F\overline{D}_+\overline{c}_+ + F\overline{u}_+\overline{c}_+\vec{E}(\vec{r}) + F\overline{c}_+(\vec{v}-\vec{v}_m) \quad (3)$$

$$\vec{J}_-' = +F\overline{D}_-\nabla\overline{c}_- + F\overline{u}_-\overline{c}_-\vec{E}(\vec{r}) - F\overline{c}_-(\vec{v}-\vec{v}_m) \quad (4)$$

where $\vec{v}$ is the fluid velocity, and $\vec{E}$ is the electric field related to the potential $\Phi$ by $\vec{E}(\vec{r}) = -\nabla\Phi(\vec{r})$. It will be noted that E in equations (3) and (4) is in general the sum of any applied field $\vec{E}_o$ and the self-field or diffusion potential field which exists if $\overline{D}_+ \neq \overline{D}_-$. The effect of convection on $\vec{E}$ will be found to be negligible for the case at hand. Finally, $\vec{E}$ is related to the fixed and mobile charge species by Gauss' Law, $$\nabla \cdot \epsilon \vec{E}(\vec{r}) = \rho_f \quad (5)$$

where $\epsilon$ is the dielectric constant (assumed uniform) and $\rho_f$ is related to the membrane volume fixed charge density $\overline{\rho}_m$ and the mobile species concentrations by $$\rho_f(\vec{r}) = \overline{\rho}_m + F(\overline{c}_+(\vec{r}) - \overline{c}_-(\vec{r})) \quad (6)$$

Equations (1)–(6) constitute a complete description of the system if $(\vec{v}-\vec{v}_m)$ is known. The problem of a rigid non-deformable membrane with $\vec{v}_m=0$ has been examined and numerical solutions exist for several special cases, e.g., $D_+=D_-$ with very high current densities only and $\vec{v}=0$. The effect of the change in intramembrane concentration on the mechanical properties of the membrane were not of interest.

In the present context, it is illuminating to use a perturbation approach and examine a limiting case which yields a simple closed form solution. It is applicable for low and high current densities, $\overline{D}_+ \neq \overline{D}_-$, and $(\vec{v}-\vec{v}_m) \neq 0$. To assemble the system of interest, a membrane is considered whose fixed-charge density is much greater than bulk solution concentrations which are initially equal $\overline{\rho}_m/F >> c_o^1 = c_o^2$. A Donnan equilibrium is assumed between membrane and bulk solutions, ad for the case $\overline{\rho}_m > 0$, $\overline{\rho}_m$ is balanced by an equal amount of uniformly distributed mobile negative ions $\overline{c}_{-o}$ in the membrane. If $c_o^2$ were now increased slightly above $c_o^1$ but remained $>> \overline{\rho}_m/F$, and if $\vec{E}_o$ were applied across the membrane, then additional mobile ions would enter or leave in perturbational amounts due to diffusion and migration, provided $\vec{E}_o$ is much less than internal double layer fields which are $\sim 10^8$ V/cm. Defining the total intramembrane concentrations as the sum of equilibrium and perturbation concentrations $\overline{c}_{\pm o}$, $\tilde{c}_\pm(x)$, respectively, $$\overline{c}_- = \overline{c}_{-o} + \tilde{c}_-(x) \quad (7)$$

$$\overline{c}_+ = \overline{c}_{+o} + \tilde{c}_+(x) \quad (8)$$

$$\tilde{c}_-(x) \approx \tilde{c}_+(x) << \overline{c}_{-o} = \overline{\rho}_m/F \quad (9)$$

where $\overline{c}_{+o} = 0$ in equation (8) can be interpreted in terms of Donnan exclusion of co-ions. The equalities in equation (9) represent the assumed quasineutrality condition, which more strictly is $|\tilde{c}_+ - \tilde{c}_-|/\overline{c}_{-o} << 1$.

This condition is well justified if membrane thickness is much greater than a Debye length $$1/\kappa, \delta >> 1/\kappa = (\epsilon RT\Sigma z_i^2 F^2 c_{io})^{\frac{1}{2}}$$

or equivalently, as long as the dielectric relaxation time in the membrane is much less than the diffusion time across the membrane. This is the case for all experiments to be presented here. The quasineutrality and perturbation inequality conditions in equation (9) together simplify the problem by decoupling Gauss' Law equation (5) from equations (1)–(4), recognizing that the electric field in the membrane is then approximately constant. The majority carriers ($\overline{c}_{-o}$) effectively shield perturbation minority carriers so that no unbalanced space charge exists in the membrane which could give rise to $\nabla \cdot \vec{E}$. An applied field will not disturb electroneutrality as long as $E_o$ is much less than internal double layer field strengths. This approach is reminiscent of that taken in membrane electrodiffusion problems and carrier flows in semiconductors.

The problem is further simplified by focusing on the positive (minority) ions and recognizing that since $\overline{c}_+ << \overline{c}_-$ and $\overline{D}_+$ and $\overline{D}_-$ are of the same order of magnitude, the positive ions are effectively shielded to the extent that the self-field migration term in equation (3) is negligible compared to the diffusion term; the self-field acts predominantly on the swamping amount of negative ions. However, as $\vec{E}_o$ can be large, the applied field term cannot be neglected in equation (3). Since the radius R of the collagen tube is such that $R << \delta$, a one-dimensional model is well justified; combining equations (1), (3) and (8) with $\nabla \to \partial/\partial x$, $\vec{v} \to v_x$, $\vec{E}_o \to E_o$, the x-directed field:

$$\frac{D\tilde{c}_+}{Dt} = \frac{\partial}{\partial x}\left[\overline{D}_+\frac{\partial \tilde{c}_+}{\partial x} - [\overline{u}_+ E_o + (v_x - v_m)]\tilde{c}_+\right] \quad (10)$$

solution of which leads to the desired perturbation profile of mobile ions $\tilde{c}_- \approx \tilde{c}_+$. The boundary conditions on the perturbation concentrations at $x=0^+$ and $x=\delta^-$, $\tilde{c}_+(0^+)$ and $\tilde{c}_+(\delta^-)$, can be calculated from the Donnan equilibrium, where $0^+$ and $\delta^-$ are several Debye lengths from the edges of the membrane:

$$\tilde{c}_+(0^+) \approx (c_o^1)^2/\overline{c}_{-o}, \; \tilde{c}_+(\delta^-) \approx (c_o^2)^2/\overline{c}_{-o} \quad (11)$$

where $\overline{c}_{-o}$ is known from equation (9). The assumption in equations (11) that $c_+(0^-) = c_o^1$ and $c_+(\delta^+) = c_o^2$ requires an adequately stirred system.

At this point the relative importance of the convection and migration terms in equation (10) must be examined. An experimental and theoretical investigation of electromechanical coupling with collagen membranes in the absence of a concentration gradient has lead to relations between measured pressure and potential drops ($\Delta P$, $\Delta V$) across the membrane and measured total current and mass flow $\vec{J}$ and $(\vec{v}-\vec{v}_m)$ through the membrane which can be cast in the form $$\begin{bmatrix} \vec{n}\cdot(\vec{v}-\vec{v}_m) \\ \vec{n}\cdot\vec{J} \end{bmatrix} = \begin{bmatrix} L_{11} & L_{12} \\ L_{21} & L_{22} \end{bmatrix} \begin{bmatrix} \Delta P \\ \Delta V \end{bmatrix} \quad (12, 13)$$

where $\vec{n}$, $\vec{v}$ and $\vec{j}$ are in the $+x$ direction, $\Delta V = V^2 - V^1$, $L_{12} = L_{21} \lesssim 0$ for $\rho_m < 0$ and $L_{22} < 0$. The relations (12, 13) are not significantly altered by the presence of the perturbation concentration gradient of interest. With $\Delta P$ constrained to be zero (the experimental constraint imposed here), fluid flow can still occur via electromechanical coupling due to the imposed $\vec{E}_o$. Thus, the convection term in equation (10) can be written in terms of $\Delta V (= J/L_{22} = E_o \delta)$ through equation (12). The ratio of the magnitudes of convection and migration terms in equation (10) is then $$\frac{|L_{12} E_o \delta \tilde{c}_+|}{|\bar{u}_+ E_o \tilde{c}_+|} = \frac{|L_{12} \delta|}{\bar{u}_+} \tag{14}$$

Figure 2:
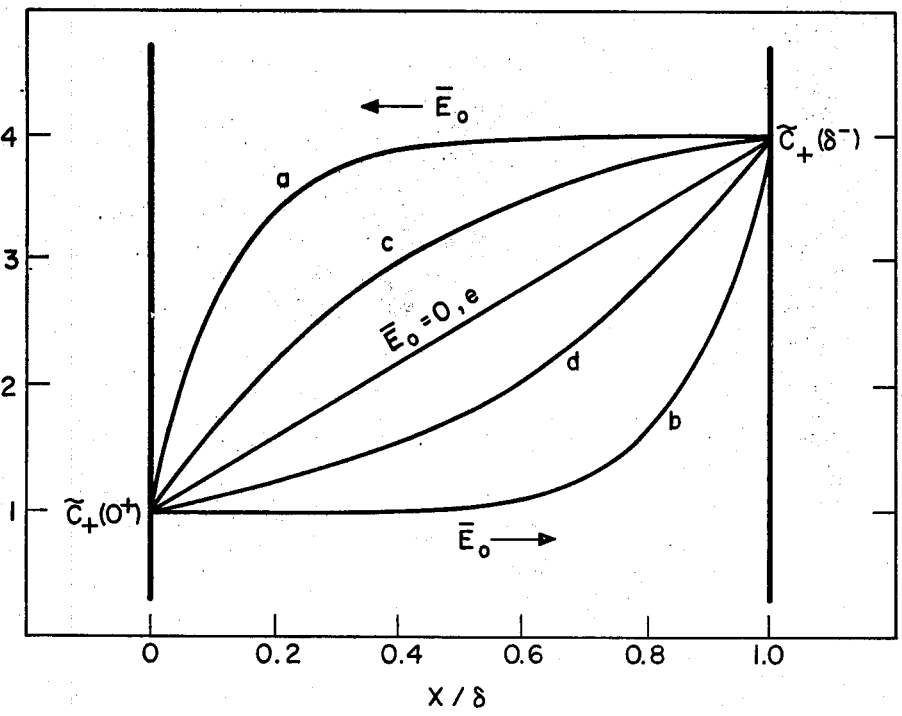
FIG. 2 is a graph showing normalized perturbation concentration $\tilde{c}_+(x)/\tilde{c}_+(O^+)$ versus $x/\delta$ inside a positively charged membrane or film of thickness $\delta$, calculated from equations herein for the case $$\tilde{c}_+(\delta^-)=4\tilde{c}_+(O^+) \cdot a, b, |E_o|=8RT/F; c, d,$$
$$|E_o\delta|=2RT/F;$$

If the ratio in equation (14) is $<<1$, then the convection term can be neglected. A comparison of the remaining migration and diffusion terms in equation (10) shows that in the steady state, migration will totally dominate diffusion only if $|E_o \delta| << RT/F$. For the general case in which the convection term is included, equation (10) is easily solved in the steady state, $D/Dt \rightarrow 0$. For the case $E_o = 0$ and $E_o \neq 0$ respectively, using equation (12) in equation (10) with $\Delta P = 0$, $$\tilde{c}_+(x) = \tilde{c}_+(0^+) + [\tilde{c}_+(\delta^-) - \tilde{c}_+(0^+)]x/\delta \tag{15}$$

$$\tilde{c}_+(x) = \frac{[\tilde{c}_+(\delta^-) - \tilde{c}_+(0^+)]e^{+E_o(1-L_{12}\delta/\bar{u}_+)(x-\delta/VT} + \tilde{c}_+(0^+) - \tilde{c}_+(\delta^-)e^{-E_o(1-L_{12}\delta/\bar{u}_+)\delta/VT}}{(1 - e^{-E_o\delta(1-L_{12}\delta/\bar{u}_+)/VT})} \tag{16}$$

where $V_T = RT/F$ is the equivalent thermal voltage $\simeq 25.7$ mVolts. Constraints other than $\Delta P = 0$ can be handled easily using equations (12) and (13) together. FIG. 2 shows the calculated, normalized concentration profile $\tilde{c}_+(x)/\tilde{c}_+(0^+)$ corresponding to equations (15) and (16 for the case $L_{12}\delta/\bar{u}_+ << 1$, i.e., neglecting convection, which applies to the membrane used here (see below). The plots are for $E_o \delta = 0$, $\pm 2V_T$, $\pm 8V_T$, with boundary concentrations $\tilde{c}_+(\delta^-) = 4\tilde{c}_+(0^+)$. It will be noted that reversing the polarity of $E_o$ in equation (16) has the effect of reversing the curvature of $\tilde{c}_+(x)$. When $L_{12}\delta/\bar{u}_+ << 1$, the solution of the equation (16) is analogous to that plotted in FIG. 2 but with the opposite sign of curvature. For a negatively charged membrane, the curvatures change sign for each of the respective cases above. Finally, given a model and prior experimental evidence for the way in which changes in intramembrane concentration lead to induced tensile forces in the fibril matrix, the experimental results to be presented can be compared with the trends predicted by the theory outlined above.

Experimental work by the present inventors is discussed in this and the next few paragraphs. Collagen tubing (dry radius 1.9 cm and wall thickness 0.0045 cm) was made from a dispersion of hide corium collagen as described by Lieberman (see U.S. Pat. No. 3,123,482) and donated by Dr. T. Tsuzuki, Devro, Inc. Somerville, N.J. The tubing was extrusion cast and plasticized with a solution of glycerin and carboxymethyl cellulose; no crosslinking agent was added. Additional impurities (primarily natural fats) were present in an amount less than 0.5 wt%. Examination of the fibrils prior to extrusion showed no loss quaternary structure; after extrusion there was no detectable evidence of any fibril orientation in the extrusion direction (the direction of the tube axis). All specimens were pre-soaked and rinsed several times with distilled water over a twenty-four hour period to remove the plasticizing agent before use. This tubing was among several samples previously used for studying electromechanical transduction properties of collagen. Results of experiments with this tubing will be compared to that obtained with an axially oriented extruded collagen fiber prepared from steer tendon, as described in the Yannas et al journal article.

A length of tubing (fifteen cm) was clamped around two PMMA discs 3A and 3B, one at each end, as sketched in FIG. 1 and as discussed above. The lower disc 3B was fixed to the bottom of a three liter vessel (i.e., the vessel labeled 8 in FIG. 1) and the top disc 3A was connected to a load cell (Instron Engineering Corp., Canton, Mass.) whose output was displayed on an Instron chart recorder. The active cylindrical membrane area of $\sim 121$ cm$^2$ separated inner and outer electrolyte baths at 23° C. that were continuously pumped from large reservoirs at a rate fast enough to maintain independent, constant bulk concentrations in the face of ion migration and diffusion across the membrane, and to minimize the effects of boundary layers at the membrane edges. The volume of fluid inside the tube was $\sim 120$ ml; inner and outer volumes were maintained constant for all experiments. The tube was initially stretched a small amount to obtain 100 g total baseline force, from which positive and negative force increments resulting from various stimuli could be measured.

In one series of experiments, the large reservoirs were disconnected and outer and inner baths of 0.06 M NaCl were inter-mixed and continually recirculated from one to the other. Successive increments of 1.0 M HCl or NaOH were then added to the outer bath, each within less than five seconds, in order to determine the force induced by changes in pH over a wide range. With recirculation, the inner and outer baths attained equal pH approximately ½ minute after each addition of reagent. In this and all other experiments, the pH was continuously monitored with a Radiometer digital pH meter PHM-63 which gave reproducible readings to 0.01 pH units. In another series with the same configuration, increments of 5 M NaCl were added to the bath which had an initial pH=2.8 due to HCl, to determine the effect of neutral salt concentration on measured force. The initial ionic strength was due to HCl alone. Mixing time for the attainment of equal inner and outer NaCl concentration was again $\sim$½ minute. All solutions were prepared from reagent grade chemicals. The force versus pH and neutral salt concentration experiments were performed as material characterizations to determine the maximum force that could be induced by electromechanochemical transduction for the given ultrastructure and orientation of the collagen specimen.

Steady electric fields were applied across the membrane 1 via the platinum electrodes 6A and 6B, to determine the effect on measured force. For the chosen configuration with the tube radius R much greater than membrane thickness, that is $R >> \delta$, the electric field inside the membrane was essentially uniform to a good approximation. Both the dc voltage applied to the electrodes and the electric current through the electrodeelectrolyte-membrane circuit was measured. In all such experiments, the large reservoirs were used to isolate inner and outer baths so as to maintain specified NaCl concentration gradient across the membrane. The three gradients chosen were 0.002 M/0.012 M, 0.012 M/0.06 M, and 0.06 M/0.2 M; with initial pH ~2.8 for both inner and outer baths. (The effect of $E_o$ with gradients in pH was not studied.) As finite electrolysis rates could lead to changes in bath pH, fluid pumping rates were maintained fast enough so that the maximum such change that could occur in the vessel (i.e., for the maximum current density used in the experimental time period of interest) was less than 0.05 pH units away from the initial pH. Low current densities were used, the maximum being ~3 ma/cm$^2$ in the membrane. Electrolysis caused negligible problems with the lowest of the three concentration combinations. However, with the highest combination, which yielded the highest current densities for a given electrode voltage, accumulation of gas limited the useful measurement time period to ~ five minutes for each application of a unit step in $E_o = J/(L_{22}\delta) = \Delta V/\delta$. As J rather than $E_o$ or $\Delta V$ was experimentally imposed, data is plotted as a function of J.

The results of the force versus pH and neutral salt concentration studies appears in FIGS. 3 and 4. The data of FIG. 3 represent the changes in force density induced by successive additions of acid or base, where force density is the measured force referred to the dry cross-sectional area of the specimen. The initial stretching force has been subtracted out in FIG. 3 and therefore the zero axis corresponds to the absence of a change in force density about the initial stretch. Open and closed circle data (O, •) correspond to he collagen tube which has dry area =0.046 cm$^2$. (For comparison, data are shown (□,■) corresponding to previous measurements performed in a like manner with an oriented collagen fiber having a dry cross-sectional area of $8.32 \times 10^{-4}$ cm$^2$.) With the tube immersed in a 0.06 M NaCl bath, the pH was initially lowered in steps to ca. 2.8 (•) then raised in steps to ca. 11.45 (O); total ionic strength increased by less than 10% over the entire course of the experiment which is thus considered as having been performed at approximately constant ionic strength. The change in force density versus time for all step changes in pH was monotonic. If one defines a "characteristic" time as that necessary for a force to reach some reference percentage, say, $1 - 1/e$ or 63% of the asymptotic force level, one observes the following: the characteristic times were longest (~ eleven minutes) at pH values ~4 and 10.5, and gradually became shorter as the pH was decreased below 4 and increased above 10.5 (as short as two to three minutes). They were shortest and sometimes barely detectable in the neutral pH range. This general behavior is similar to that previously found by others with collagen fibers. It was found (see the Yannas et al journal article) that the equivalent force densities available with an oriented fiber were more than an order of magnitude larger than that with the randomly oriented tube used by the present inventors. The effect of neutral salt concentration at constant acidic pH is summarized in FIG. 4, corresponding to experiments with the same specimens as those of FIG. 3. These data show the change in force density after successive additions of NaCl, once again with the initial stretching or bias force subtracted. In each experiment the initial step was the adjustment of the acidic pH using HCl and the attainment of the corresponding equilibrium force. The first data point in each curve refers to this force and the anion (Cl$^-$) concentration due to HCl alone. Subsequent addition of NaCl with both specimens led to changes in force that were not monotonic in time; rather there ensued an initial decrease followed by a slower increase whose asymptotic value was larger than the previous equilibrium state. This is clearly seen in FIG. 5A, which corresponds to the transition between the first and second fiber data points of FIG. 4. Similar behavoir was observed with the tube specimen for point up to ~0.025 M; the characteristic time for the secondary increase in force was ~2.5–4 minutes. After a certain anion concentration was reached (typically that of the maxima in the curves of FIG. 4, ~0.025 M for the tube and ~0.002 M for the fiber specimens), further additions of NaCl were accompanied by only the initial, relatively fast decrease in force with no subsequent slow increase as before. The force was found to decrease continuously with increasing anion concentration after this point (cf. FIG. 4). In this latter region of the curve, the characteristic time for each decrease in force was typically fifty seconds or less for the case of the collagen tube. Approximately thirty seconds of this time was attributable to bath mixing after pipetting of reagent. (The equivalent time for the fiber was twelve seconds including a ~ five second mixing time.)

The quantitative response of the collagen tube to an electric field (imposed J) is summarized in FIG. 6. Representative data are shown corresponding to five experiments with the same specimen using positive and negative J with the three concentration gradients chosen. In each experiment, the initial step was the establishment of the concentration gradient with both inner and outer baths at he same pH=2.8. This resulted in a corresponding equilibrium force density. A step jump in J was then applied and turned off after five minutes. This was followed by another turn-on, turn-off cycle, etc. The data of FIG. 6 are the changes in force density attained after J had been on for five minutes and a new steady state force had been reached; the initial equilibrium force density has once again been subtracted. It is important to note that a positive force density was induced in all cases when $c_o^2 > c_o^1$ and J (or $E_o$) was positive, $E_o > 0$ being defined as pointing from outside to inside across the membrane. Reversing the polarity of $E_o$ with $c_o^2 > c_o^1$ reversed the polarity of the induced force density. For all cases in which $c_o^2 < c_o^1$, $E_o > 0$ induced negative forces and conversely. The characteristic time for the turn-on transients, that is, the transient change in force after J was turned on, were in the range of thirty-six to eighty seconds. With all three concentration gradients, the turn-on time constant was found to decrease as the value of the applied J was increased, in some experiments by as much as 50% for the range of J used. For each turn-on, turn-off cycle, the turn-off time constant was invariably longer than the turn-on time constant, in some cases by a factor of two or three. From a comparison of such time constants it has been estimated that the values of applied $|\Delta V| = |E_o\delta|$ used in these experiments, corresponding to the current densities used, are in the range 0 to $\sim 10RT/F \approx 250$ mVolt.

Finally, in another series of experiments with $c_o^1 = 0.012$ M and $c_o^2 = 0.002$ M NaCl at pH=2.8 (i.e., the lowest concentration combination of the three), the applied current was left on for thirty minutes for several different values of J. It was found that typically six to eight minutes after turn-on, a slow drift of force occurred which lowered the force below the level corresponding to the five-minute "asymptotic" value, as shown in FIG. 5B. As previously mentioned, problems due to electrolysis prevented equivalent long-time measurements with the higher concentration combinations.

A model which would adequately explain the observed effect of an electric field on tensile forces in collagen can be constructed on the known internal electrostatic interactions inherent to collagen in aqueous media with no applied field, the trends predicted by the theoretical treatment above, and the ultrastructural features of the collagen specimens. The tubing films used in the present electromechanical studies have fibril orientation which is random in the plane of the film, while the fibers can be considered as having a network of fibrils which are highly oriented in the direction of the fiber axis. In addition, previous experiments have shown that the film acts as a permeable membrane through which water and small ions can be transported. In the range of pH and ionic strength studied, the tertiary structure of the fibers and films is predominantly unaltered at 23° C. When bath pH is shifted away from the isoelectric point, both specimens attain a net primary or "fixed" charge according to well accepted notions. The exact spatial distribution of mobile counter ions, i.e. the electrical double layer, depends on the spatial geometry of the primary charge. With charged fibers in the absence of an applied electric field, interaction between double layers has been found to produce repulsive forces which are strongest, because of the predominantly axial orientation, in the direction normal to the fiber axis. These lateral repulsive forces are converted by the fibril matrix to macroscopic axial forces. The same repulsive forces exist in the charged collagen tube, as is evidenced by visible swelling in the lateral direction when the pH is shifted away from the IEP. However, because of the one fewer degree of orientation, one would expect in general that the summed effect of such repulsive forces would lead to axial macroscopic force densities smaller than that of a comparable cross-sectional area of oriented fibers.

That these lateral repulsive forces can give rise to isometric axial forces in the collagen tubing is seen in the data of FIGS. 3 and 4, the trends of which data are very similar to that of the collagen fibers. Thus, in FIG. 3, an increase in net positive or negative charge at low or high pH, respectively, and at constant ionic strength (constant Debye length), gives rise to an increase in force density independent of the sign of the charges. The force density induced in the tube is typically about twenty-five times less than that of the fiber at a given pH; the pH of zero induced force density can be considered a measurement of the IEP for those insoluble collagen specimens. Finally, the long characteristic times associated with changes in tube density due to step changes in pH two (two to eleven minutes) can be understood in terms of the diffusion-limited chemical reaction that takes placed upon addition of HCl of NaOH to the bath. These experimental times will henceforth be referred to as $\tau_{H+}$.

The force density versus anion concentration data shows that two electrostatically mediated events, whose effects are to produce forces of opposite polarity (direction), can occur simultaneously. An increase in concentration of a relatively non-binding or non-reacting salt (e.g., NaCl) at constant pH leads to a decrease in internal Debye lengths at a rate governed by ionic diffusion into the matrix, as represented by the characteristic diffusion time $\tau_{diff} \sim \delta^2/2\overline{D}$. (The dielectric relaxation time $\delta_e = \epsilon/\sigma$ for reordering of the ionic atmospheres once diffusion has occurred is $\sim 10^{-7}$-$10^{-9}$ seconds which is $<< \tau_{diff}$, where $\sigma$ is conductivity.) $\tau_{diff}$ should theoretically be less than $\tau_{H+}$; for the tubing, $\tau_{diff}$ is calculated to be $\sim$ fifteen to twenty seconds. The diffusion-limited decrease in $1/\kappa$ leads first to a concomitantly fast decrease in force (e.g., FIG. 5A). It is well known, from titration studies, however, that such a manifestation of electrostatic interaction between protein side groups can lead to a change in dissociation equilibrium for collagen and other polyelectrolytes; in this case the increase in bath concentration could lead to an increase in the fraction of groups dissociated. Such an increase in net charge would, in fact, lead to the secondary rise in force seen in FIG. 5A and also found within the tube. The fact that the initial decrease in force is found to occur in a time $\sim \tau_{diff}$ and that the secondary increase occurs in a time $\sim \tau_{H+}$ both for the tube and the fiber supports this view. Therefore, the initial quick decrease in double layer repulsion can be considered the result of a decrease in $1/\kappa$ at lowed by a slow increase in charge at the new, constant $1/\kappa$. This force versus time dependence is seen for the tube up to $\sim$0.025 M. Above this concentration, the absence of any slow secondary change in force suggests that collagen charge has remained constant even with further addition of salt at the given bath pH. The continued occurrence of the initial decrease in force as additional salt is added shows, however, that the first electrostatic effect is still present; this is again supported by the experimental time constants which are $\sim \tau_{diff}$. The importance of the various time constants characterizing the physical processes found in the "baseline experiments" of FIGS. 3–5A is stressed in order to establish one context in which to examine the electric field-induced forces. Parenthetically, it appears that such macroscopic measurements provide significant insight concerning the study of certain electrically-mediated rate processes affecting the collagen at the ultrastructural level.

In order to interpret the trends of the electromechanochemical transduction data of FIG. 6, one can focus on the polarity of the induced force as a function of the polarity of $E_o$ given the relative magnitudes of $c_o^1$ and $c_o^2$, the magnitude of the induced force compared to previously found electrokinetically induced forces, the time constants associated with the present $E_o$-induced forces, the three ranges of concentration gradients used, and the force data of FIGS. 4, 5A and 5B. These trends are compared with those predicted by the theoretical model presented above. With respect to the latter, equation (16) and FIG. 2 have been derived for the case $\bar{p}_m/F >> c_o^1, c_o^2$; the literature contains numerical calculations for the case $\bar{p}_m/F$ less than bulk concentrations, with $\bar{v}_m=0$, $\overline{D}_+ = \overline{D}_- (\overline{E}_{self}=0)$, and large J (or $E_o$). The trends of the latter solution are identical with those predicted by equation (16) in the frame of the membrane, concerning the way in which intramembrane concentration can be increased or decreased by $E_o$, with or without significant convection. The actual experiments (FIGS. 6) fall roughly between these two limits; $\bar{p}_m/F \lesssim 0.1$ M for the electrolyte conditions used. In addition, measurements on the collagen tube used here have shown that the ratio in equation (15) is less than $10^{-2}$ (with the assumption that co-ion mobility is not significantly different from that in bulk solution); therefore convection in equation (16) can be neglected and one can use equation (16) and FIG. 2 for ease of comparison with experimental data herein discussed.

All the experiments represented in FIG. 6 show induced force density polarities which can be interpreted in terms of the hypothesis that a change in mean intramembrane salt content leads to a concomitant change in $1/\kappa$ and hence to a change in lateral repulsion forces and total force density. In quadrant I of FIG. 6, for example, a positive J induces positive force; the larger the J, the larger the force. Equation (16) and FIG. 2 predict that a positive $E_o$ with $c_o^2 > c_o^1$ causes a decrease in mean intramembrane salt content (and therefore to an increase in $1/\kappa$); the larger the $E_o$ the less the mean salt content. Reversing the polarity of $E_o$ conversely leads to an increase in salt concentration. Such a prediction is in accordance with the observation of a negative induced force as seen in all the data in Quadrant III of FIG. 6. When $c_o^1 > c_o^2$ the polarity of the induced force versus $E_o$ was found to be opposite that of the previous cases (quadrants II and IV). These latter observations can also be interpreted in an identical fashion with respect to FIG. 2. This reversal appears to cancel, by itself, the possibility that the observed forces might be caused by a simple electrokinetic (e.g., electrophoretic) "push" on the membrane, an effect which has been observed in the past in homogeneous electrolyte baths. Simply switching the inner and outer baths (i.e., reversing the concentration gradient) without changing the sign of $\bar{\rho}_m'$ would not lead to a reversal in force polarity for the same $E_o$ based on an electrokinetic interpretation. Further, the magnitude of electrokinetically induced force densities has been found to be less by almost an order of magnitude than those of FIG. 6, for an equivalent $E_o$.

The proposed hypothesis is entirely unambiguous in the case of the 0.06 M/0.2 M data ($\Delta$, $\blacktriangle$) of FIG. 6, since the equilibrium force density curve of FIG. 4 (for the collagen tube) shows an inverse relationship with concentration in this range. Qualitatively, $E_o$ might be construed as a means of constraining the total force density to follow a path defined by this part of the curve. However, such an argument would not coincide with the observed proportionality of the equilibrium force (cf. FIG. 4) in the 0.002 M to 0.025 M range. To reconcile these observations, the detailed time response of the $E_o$-induced force in this low concentration range must be examined (cf. FIG. 5B). One first notes that the initial changes in $E_o$-induced force for all the experiments of FIG. 6, including the low concentration ranges, were characterized by time constants $\tau_{E_o} \sim$ thirty-six to eighty seconds, which are roughly on the order of calculated $\tau_{diff}$. This in itself is further evidence that induced changes in intramembrane concentration are initially at work, as opposed, for example, to diffusion-limited reaction processes which would accompany an $E_o$-induced change in pH. The slow reversal in force (with a time in the range $\sim \tau_{H+}$) seen in FIG. 5B can be interpreted once again as a change in dissociation and hence a slow charging process, in this instance due to the $E_o$-induced change in neutral salt concentration. Such a reversal is in accordance with the interpretation of FIG 5A, the low concentration data of FIG. 4, and the known charging properties of collagen. However, the data of of FIG. 6 correspond to the five-minute "steady state" force densities attained before such secondary force reversals are seen to occur. The inventors conclude that since $\tau_{E_o} \sim \tau_{diff} << \tau_{H+}$, the data of FIG. 6 with the low ionic strength combinations should not be interpreted via the long-time equilibrium curve of FIG. 4 in the equivalent concentration range, but rather is consistant with the proposed hypothesis.

The relationship between $\tau_{E_o}$ and $\tau_{diff}$ can be examined further in the context of the limiting model for electromechanochemical transduction embodied in equation (10). The full transient solution of equation (10) in the case of negligible convection ($D/D \neq 0$, $V = V_m = 0$) has been given with respect to squid axon electrodiffusion problems in terms of a Fourier superposition with a governing time constant for the establishment of the steady state concentration profile; the latter can be cast in the form, $$\tau = \tau_{diff} \left[ \frac{1}{1 + \left(\frac{|E_o \delta|}{2\pi V_T}\right)^2} \right] \quad (17)$$

The characteristic times for $E_o$-induced forces $\tau_{E_o}$ should thus be directly related to the $\tau$ of equation (17) according to the present hypothesis. Equation (17) thus suggests that the turn-on time $\tau_{E_o} \propto \tau(E_o \neq 0)$ for force transients should be less than the turn-off time $\propto \tau(E_o = 0) = \tau_{diff}$. This in fact has been observed as noted previously herein. In addition, equation (17) predicts that $\tau_{E_o}$ should decrease with increasing $E_o$ which also has been observed. (Measurements of $L_{22}$ are currently in progress to compare the $\Delta V$ predicted by equation (17) with that calculated from $\Delta V = J/L_{22}$.) Therefore, diffusion is not rate limiting for $E_o \neq 0$.

Several additional comments concerning the data of FIG. 6 are in order. If a highly oriented tube were used in the present configuration, then force densities $\sim$ twenty-five times larger could be obtained; thus a 4 N/cm$^2$ excursion obtained by switching from $+E_o$ to $-E_o$, say, on the curves of FIG. 6 would translate to $\sim 100$ N/cm$^2$. Second, a curve of force density versus $|E_o|$ should, in general, be nonlinear and should saturate for high enough $E_o$, given the known upper and lower intramembrane concentration limits defined by $c_o^1$ and $c_o^2$. This can be seen in the trends of the theoretical curves of FIG. 2. Finally, although the curves of FIG. 2 predict antisymmetric concentration profiles for $+E_o$ and $-E_o$ about the profile for $E_o = 0$, the profiles and therefore forces are in general not symmetric when the conditions $\bar{\rho}_m/F >> c_o^1, c_o^2$ are not satisfied.

Examination of the trends of electromechanochemical transduction experiments viewed in the context of a theoretical model appear to confirm the feasibility of such a transduction process, in which an applied $E_o$ is used to control intramembrane concentration profiles thereby inducing tensile forces. The isometric force densities involved are not insignificant by analogy to those of striated muscle. Characteristic times for the transduction process can be made much smaller than that observed here by proper material design, e.g., by using much thinner membranes which could be overlapped so as to maintain sufficient cross-section and therefore significant total force.

While the above paragraphs have described the use of monovalent neutral salts as the mobile ions of interest, divalent, trivalent and other multivalent ions can also be used to induce non-specific electrostatic interactions with the polyelectrolyte molecules by means of an externally applied electric field. Once can qualitatively interpret the effect of ion valence $Z_i$ on electrostatic interactions from the previously defined Debye length, $1/\kappa = (\epsilon RT/\epsilon Z_i^2 F^2 c_{io})^{\frac{1}{2}}$. In short, a lower concentration of a multivalent ion can accomplish the same perturbation in electrostatic interaction as that accomplished by a monovalent species. Therefore, an even smaller concentration gradient of a multivalent ion species is needed to electromechanochemically induce a given tensile force in the polyelectrolyte matrix. The advantage here is that smaller required concentration gradients mean lower chemical energy consumption and thus greater efficiency in the overall energy conversion or transductive coupling process.

In the experiments described in the Grodzinsky and Shoenfeld report, the polyelectrolyte of interest was pure collagen. In order to achieve sufficient fixed molecular collagen charge, an electrolyte pH $\lesssim 4.0$ or $\gtrsim 9.5$ had to be used. However, the collagen can, in general, be chemically modified or collagen/proteoglycan composites or other polyelectrolytes can be used for the purpose of having a material which is charged at physiological pH = 7.4 or in any desired pH range of interest.

Yet another class of electromechanochemical coupling device is based on a transduction process wherein an applied electric field is used to actively control the intramembrane profile of specific mobile ion species. These specific salts enter into specific chemical reactions with the polyelectrolyte molecules and thereby cause changes in the conformation of these molecules which, in turn, produce tensile forces in the matrix. One example is the electric field control of H+ and OH− ions which react with the fixed dissociable charge groups of many polyelectrolytes including collagen and result in a change in the magnitude of the fixed charge. The results of such a change and the concomitant production of tensile forces are discussed in the Grodzinsky and Shoenfeld report. Another example is the control of certain specific salts which will cause a partially reversible denaturation of the polyelectrolyte. With collagen, salts such as LiBr have been found by other investigators to cause such a denaturation of and the resulting production of tensile forces. Here, the use of an applied electric field will result in a faster, localized, active control of such a response.

The electromechanochemical transductive coupler shown in FIGS. 7A and 7B is like the device of FIG. 1, but some of the elements in FIG. 1 are not shown in the latter figures. Thus, for example, the container 8 of FIG. 1 is implied in FIGS. 7A and 7B, it being assumed that the bath 2 of FIGS. 7A and 7B is maintained in place, designations $c_{in}$ and $c_{out}$, representing the inner and outer concentration of mobile ions corresponding to $c_o^1$ and $c_o^2$ in FIG. 1. FIG. 7A represents a situation in which an electric field is applied, expanding the cross-dimension of the film or tube 1 and creating a tensile force between the force points 4 and 5.

The experiments in the Grodzinsky and Shoenfeld report show that electric field-induced changes in the microscopic structure of a polyelectrolyte can be harnessed, on the one hand, to yield a macroscopic force and the concomitant performance of mechanical work. On the other hand, such changes in polyelectrolyte architecture at the ultrastructural level must also manifest themselves in altered hydrodynamic and ionic permeabilities. Thus, the electromechanochemical transduction mechanisms of interest here also have important implications concerning the possibility of altering transport across polyelectrolyte membranes by, for example, applied electric field-induced changes in equivalent pore size.

All of the above remarks concerning the different mechanisms which can be harnessed to yield electromechanochemical force transduction devices (e.g., the use of monovalent and multivalent neutral salts to effect non-specific electrostatic interactions, the use of specific salts which effect certain chemical reactions leading to specific conformational changes, all controlled by an applied electric field) apply in a like manner to transductive coupling interactions which can be harnessed to yield electromechanochemical filtration devices.

The device marked 110 in FIGS. 8A and 8B is an electromechanochemical filter for filtration of molecules which move in a fluid stream from left to right through the filter 110 as represented by the arrow in each figure. The device 110 comprises electrodes $6B_1$, $6B_2$ and $6B_3$, which are the + electrodes and electrodes $6A_1$ and $6A_2$ that are sandwiched between the electrodes $6B_1 \ldots$ and which are the − electrodes. More specifically, there are a plurality of membranes 1A ... 1D, each membrane being disposed between two electrodes (e.g., the membrane or film 1A is disposed between the + electrode $6B_1$ and the − electrode $6A_1$ such that the $\vec{E}$ appears across the thickness dimension of the film 1A). The fluid to be filtered moves from left to right into the membranes 1A ... 1D and is filtered by each membrane; molecules are sequentially removed from the fluid by a membrane under the control of the electric field $\vec{E}$ whose intensity is controlled to effect selectivity. Indeed, the field between one pair of membranes can differ from the field between another pair by appropriate electric connections.

The filtration device of FIG. 8A is based on the use of neutral salt mobile ion species whose intramembrane or intrafilm concentration profile is actively controlled by the applied electric field. Changes in the intramembrane mobile ion concentrations induce changes in the polyelectrolyte intrafibrillar spacing and therefore the equivalent or average pore size by means of altering non-specific electrostatic repulsion forces between the polyelectrolyte molecules. Thus, the electromechanochemical transductive coupling mechanism is similar to that which has been harnessed to yield tensile forces when used in the configuration of FIG. 1.

A mobile ion concentration gradient is initially established across each membrane in the filter of FIG. 8A to enable the transduction interaction which occurs at the level of polyelectrolyte ultra structure. The mobile ion concentrations $c_1$ and $c_2$ in FIG. 8A are therefore analagous to $c_o^1$ and $c_o^2$ of FIG. 1. In general, however, the concentration $c_1$ and $c_2$ could represent divalent, trivalent or other multivalent neutral salt species, or specific salts which would react chemically with the polyelectrolyte molecules, thereby changing their conformation and altering the equivalent pore radii of the membranes.

Yet another method of filtration using the device of FIG. 8A could be accomplished which does not require fluid flow. Rather, the fluid containing the molecules to be separated is put in alternate chambers of the filter, each chamber separated by polyelectrolyte membranes. The applied electric field is then used to increase the pore radii electromechanochemically in a smooth predetermined time sequence. Molecules which have been put in their initial chambers then are able to move across the membrane when the membrane pores become large enough as determined by the applied field. Net motion of molecules across the membranes is due to diffusion and migration in the electric field which is present in the electrolyte bath as well as in the membrane; migration will be important for those molecules which are ionized. These molecules are then collected at will from the neighboring chambers. By this technique one can separate molecules of various sizes from a solution initially containing many different sizes of molecules and by any time sequence desired simply by controlling the applied electric field.

Further modifications of the invention herein disclosed will occur to persons skilled in the art and all such modifications are deemed to be within the spirit and the scope of the invention as defined by the appended claims.

What is claimed is:

1. An electromechanochemical transductive coupler for use in connection with an aqueous electrolyte containing mobile ions that comprises, in combination:
   a deformable polyelectrolyte film comprising fixed charge molecular groups, which film, when immersed in an aqueous electrolyte containing mobile ions which enter into the film, is operable to provide a force that is a function of the structural configuration of the matrix of the film, said structural configuration being a function of the internal concentration profile of mobile ions inside the polyelectrolyte film, which internal concentration profile is a function of an electric field applied across the thickness dimension thereof;
   means to apply an electric field across the thickness dimension of the film to actively control the internal concentration profile of mobile ions inside the polyelectrolyte film and thus control the force generated by the film; and
   means connected to the film to couple said force therefrom.

2. An electromechanochemical transductive coupler as claimed in claim 1 wherein the polyelectrolyte of which the film is composed is a protein.

3. An electromechanochemical transductive coupler as claimed in claim 2 wherein said means to apply an electric field includes electrodes for immersion in the aqueous electrolyte.

4. An electromechanochemical transductive coupler as claimed in claim 1 wherein the polyelectrolyte of which the film is composed is glycosaminoglycan.

5. An electromechanochemical transductive coupler as claimed in claim 1 wherein said means to apply an electric field includes electrodes for immersion in the aqueous electrolyte.

6. An electromechanochemical transductive coupler as claimed in claim 1 wherein a force is produced by external electric field active control of said internal profile and wherein the mobile ions act nonspecifically with the molecules of the film to modulate electrostatic interactions between the charged molecules of the film which interactions produce the said force, and the force is smoothly varied and actively controlled by the applied electric field.

7. An electromechanochemical transductive coupler as claimed in claim 1 wherein the mobile ions are monovalent or divalent or trivalent.

8. An electromechanochemical device as claimed in claim 6 wherein the pH=7.4, for use in implantible assist device applications at human physiological pH.

9. An electromechanochemical device as claimed in claim 1 wherein the polyelectrolyte film is chemically modified in such a way as to possess fixed charge, that is dissociated, groups in a predetermined pH range to provide a predetermined pH range for the operation of transduction coupler device.

10. An electromechanochemical device as claimed in claim 9 wherein the mobile ions act nonspecifically with the molecules of the film to effect nonspecific electrostatic induction of tensile forces with the polyelectrolyte film matrix, the mobile ions and said charge groups being chosen to provide said tensile force to occur at any desired pH.

11. An electromechanochemical device as claimed in claim 1 in which said means to apply an electric field comprises means applying an external electric field which interacts with the film to generate a tensile force that is produced by external electric field active control of the profile concentration of certain mobile ions, in which these particular mobile ions interact specifically with certain groups of the polyelectrolyte molecules of said film to cause a specific change in the concentration of polyelectrolyte molecules and a resulting dimensional change of the molecules of the polyelectrolyte matrix, leading to the production of tensile forces and mechanical work.

12. An electromechanochemical device as claimed in claim 11 wherein the polyelectrolyte of which the film is composed is a protein and in which said tensile force is produced by a conformational change which is a reversible denaturation of a protein molecule, the denaturation being actively controlled, that is, being turned on and off by means of the electric field applied across the film.

13. An electromechanochemical device as claimed in claim 11 in which said tensile force is produced by the active electrical field control of intrapolyelectrolyte $H^+$ and $OH^-$ concentration which causes a change in the fixed dissociable charge of the polyelectrolyte and hence electric field control of tensile forces.

14. An electromechanochemical device that comprises, in combination, a deformable polyelectrolyte film comprising fixed charge molecular groups, said polyelectrolyte film being adapted to be immersed in an aqueous electrolyte comprising mobile ions which enter the film, said polyelectrolyte film having a hydrodynamic permeability that is dependent, in part, upon the average interfibrillar separation distance and hence the internal concentration profile of the mobile ions therein, the internal concentration profile of the mobile ions being a function of an electric field in the region occupied by the film and across the thickness dimension thereof, and means to apply an electric field across the thickness dimension of the film to control the internal concentration profile of mobile ions inside the polyelectrolyte film, and hence the hydrodynamic permeability of the polyelectrolyte film, the intensity of the electric field being controllable to actively control in a smooth, variable fashion, said hydrodynamic permeability.

15. An electromechanochemical device as claimed in claim 14 wherein said mobile ions include neutral salt ions and wherein the change in hydrodynamic permeability of the polyelectrolyte film is brought about by electric field active control of the content of intra-film neutral salt ions which modulate nonspecific electrostatic interactions between the charge molecules of the polyelectrolyte film, said means to apply an electric field being operable to vary the intensity of the electric field to effect said active control.

16. An electromechanochemical device as claimed in claim 14 wherein certain of the mobile ions act specifically with certain of said fixed charge molecular groups of the polyelectrolyte molecules and wherein the change in hydrodynamic permeability of the film is brought about by external electric field control of said certain mobile ions which act specifically with said certain of said fixed charge molecular groups of the polyelectrolyte molecules, thereby causing a specific conformational change in the polyelectrolyte molecules.

17. An electromechanochemical device as claimed in claim 16 wherein the polyelectrolyte film is a protein film and the conformational change is a denaturation of the protein which can be turned on and off by the external electric field applied across the film.

18. An electromechanochemical device as claimed in claim 14 wherein external electric field control of the profile of mobile ions within the polyelectrolyte film results in a change in the permeability of the film to other charged or neutral molecules in said aqueous electrolyte, the applied electric field being used as an active switch to vary smoothly the permeability of the polyelectrolyte film.

19. An electromechanochemical device as claimed in claim 18 wherein the change in permeability to certain molecules of interest is brought about by applied electric field control of other mobile ions in the aqueous electrolyte which act nonspecifically to modulate electrostatic interactions between the charged molecules of the film, which said interactions produce the change in permeability.

20. An electromechanical device as claimed in claim 19 wherein the molecules of interest are protein molecules or their individual subcomponent amino acids.

21. An electromechanochemical device as claimed in claim 18 wherein the change in permeability of the film to charged and neutral molecules is induced by external electric field active control of certain mobile ions which act specifically with certain groups of polyelectrolyte molecules, thereby causing a specific conformational change in these molecules.

22. An electromechanochemical device as claimed in claim 18 wherein the film is a protein and the change in premeability is effected by a conformational change which is a denaturation of the protein which can be turned on and off by the external electric field applied across the thickness dimension of the film.

23. An electromechanochemical device as claimed in claim 14 comprising a plurality of polyelectrolyte films separated from one another to provide a space therebetween to receive a fluid containing molecules whose flow into and out of said space is to be selectively controlled by controlling said hydrodynamic permeability, said means to apply an electric field being operable to apply an electric field across the thickness dimension of each film of the plurality of polyelectrolyte films to establish the hydrodynamic permeability for each film to control flow of the molecules in the fluid through said each film of said device.

24. A device as claimed in claim 23 wherein the films of said plurality of polyelectrolyte films are spaced serially from one another so that fluid flow is in one direction within the device and in which space between adjacent films, at equilibrium, contains molecules of the fluid whose concentrations are graded by the intensity of the electric field across the films that define that space.

25. An electromechanochemical device having, in combination: porous polyelectrolyte fibrous film means comprising fixed charge molecular groups; an aqueous electrolyte comprising mobile ions, said film being immersed in said aqueous electrolyte, the spacing of the fibers of the film and hence the pore size thereof being a function of an electric field in the region occupied by the film and having a component directed across the thickness dimension of the film; and electrical means to apply an electric field across the thickness dimension of the film to actively control in a smooth, variable fashion, the spacing of the fibers of the film.

26. A filter for filtering a solution containing mobile ions that comprises, in combination: a flexible membrane in the form of fibrous deformable polyelectrolyte film means comprising fibers composed of fixed charge species for immersion in the solution, intrafibrillar spacing of the fibers providing pores to permit entry of the solution into and through the membrane, some of the mobile ions entering the membrane in concentrations determined by the character of said membrane, the intramembrane concentration profile of the mobile ions being controllable by an applied electric field across the thickness dimension of the membrane; and means for applying an electric field whose intensity is controllable across the thickness dimension of the membrane to control intramembrane mobile ion concentrations which control intrafibrillar spacing and therefore the equivalent or average pore size of the membrane pores.

27. For use in association with a solution containing mobile ion, apparatus that comprises, in combination, a membrane in the form of a fibrous deformable polyelectrolyte film comprising fixed charge molecular groups for immersion in the solution, and means to apply an electric field of controllable intensity across the thickness dimension of the membrane, which membrane, when immersed in the solution, attracts the mobile ions which appear as intramembrane mobile ions, the intensity of the electric field across the membrane being effective to control imtramembrane mobile ion concentrations, which concentrations control intrafibrillar spacing of the fibers that form the membrane.

28. A system for use in an environment that includes mobile ions that comprises, in combination: a deformable membrane formed of fibers comprising fixed charge molecular groups to receive said mobile ions which enter the membrane and concentrate as intramembrane mobile ions therein, intrafibrillar spacing and therefore the equivalent or average pore size of membrane pores being determined by system parameters that include the electrical, mechanical and chemical properties of the membrane as well as the intensity of an electric field across the thickness dimension of the membrane; and means to apply an electric field of controllable intensity across the thickness dimension of the membrane to control to the intramembrane concentration profile of the mobile ions and hence said pore size.

29. For use in conjunction with a solution that contains mobile ion, a system that comprises, in combination, a porous membrane in the form of a fibrous deformable polyelectrolyte film comprising fixed charged groups, and means to apply an electric field of controllable intensity across the thickness dimension of the membrane, which membrane, when immersed in the solution, attracts the mobile ions which appear as intramembrane mobile ions, the strength of the electric field across the membrane being effective to control intramembrane mobile ion concentration, which concentration controls intrafibrillar spacing and hence pore size in the porous membrane.

30. An electromechanochemical device for operation in a solution that contains mobile ions, that comprises the combination of fibrous polyelectrolyte film means for immersion in the solution and comprising fixed dissociated charge species, said fibrous polyelectrolyte film means comprising interleaved fibers that define pores whose sizes are a function of fiber spacing, and electric field generating means to provide a field across the thickness dimension of the fibrous polyelectrolyte film means, some of said mobile ions, upon immersion of the film means in the solution, entering the pores of the film with concentrations whose internal profile is a function of the intensity of the electric field, the sizes of the pores being a function of said internal profile, said field generating means being operable to control the field intensity.

31. An electromechanochemical device as claimed in claim 30 wherein the field generating means comprises electrode means for immersion in the solution and positioned to direct an electric field across the thickness dimension of the film means and a source of electric potential to energize the electrode means.

32. An electromechanochemical device as claimed in claim 31 operable to effect filtration, said film means comprising a plurality of membranes separated from one another forming a space to receive a fluid to be filtered, in which the electrode means comprises electrodes at either side of each film connected to receive said electric potential and operable to apply an electric field across the thickness dimension of each film, whose intensity is controlled to effect selectivity of the size of the pores in the plurality of membranes.

33. An electromechanochemical device as defined by claim 32 wherein the electric field generating means is operable to provide, selectively, the electric potential applied across each membrane of the plurality of membranes.

34. An electromechanochemical device as defined by claim 32, that is operable to receive the fluid as a fluid stream which flows successively through the membranes which are positioned substantially parallel to one another in a serial configuration such that the average fluid stream flow is substantially orthogonal to the membranes.

35. An electromechanochemical device as defined by claim 34 wherein the electric field generating means is operable to provide, selectively, the electric potential applied across each membrane of the plurality of membranes.

36. An electromechanochemical device as defined by claim 31 wherein the film means comprises at least one non-rigid and deformable membrane operable to permit convective flow of fluid in and across the membrane.

37. An electromechanochemical device as defined by claim 36 wherein the membrane is composed of protein.

* * * * *